W. McWILLIAMS.
AUTOMOBILE SIGNAL.
APPLICATION FILED JUNE 15, 1921.
1,408,461.
Patented Mar. 7, 1922.
2 SHEETS—SHEET 1.
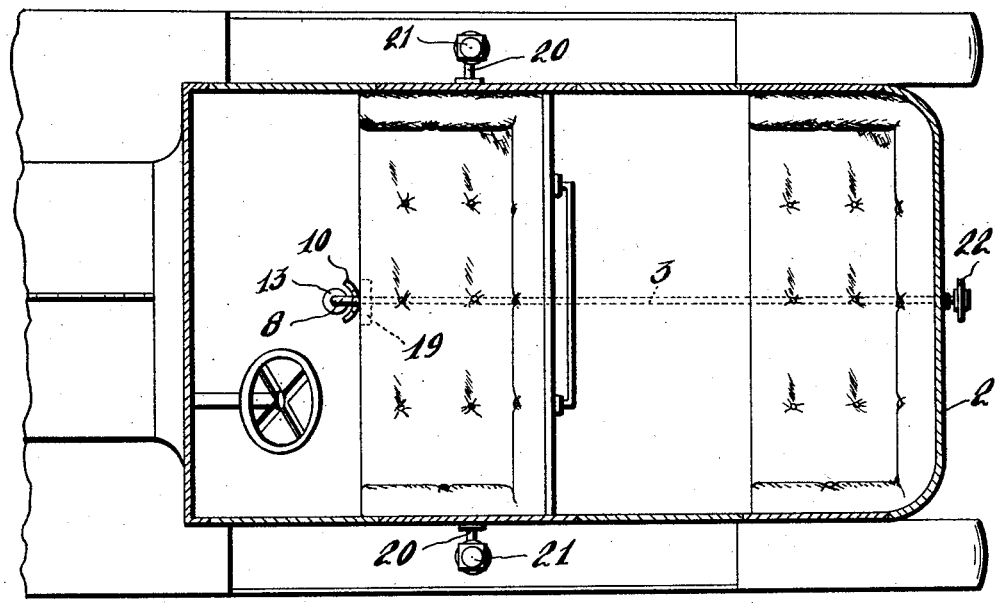
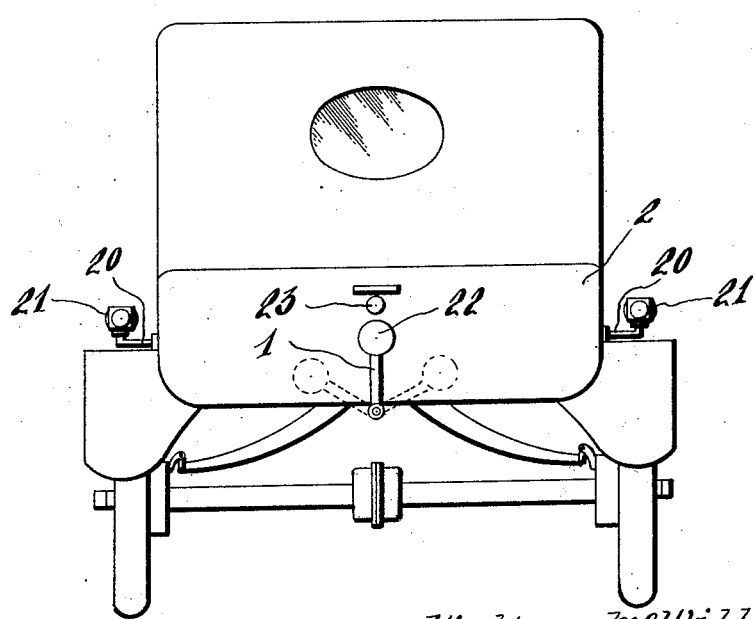
Inventor
Walter McWilliams
By Townshend & Townshend
Attorneys

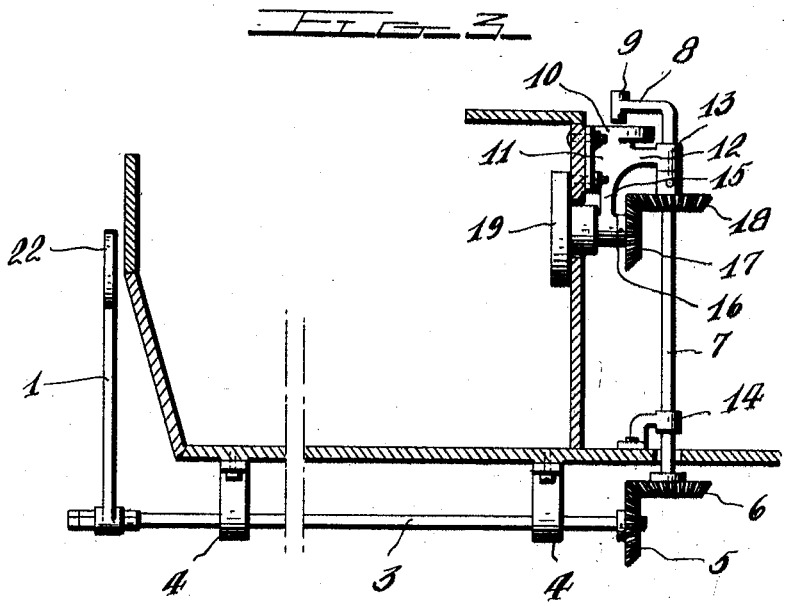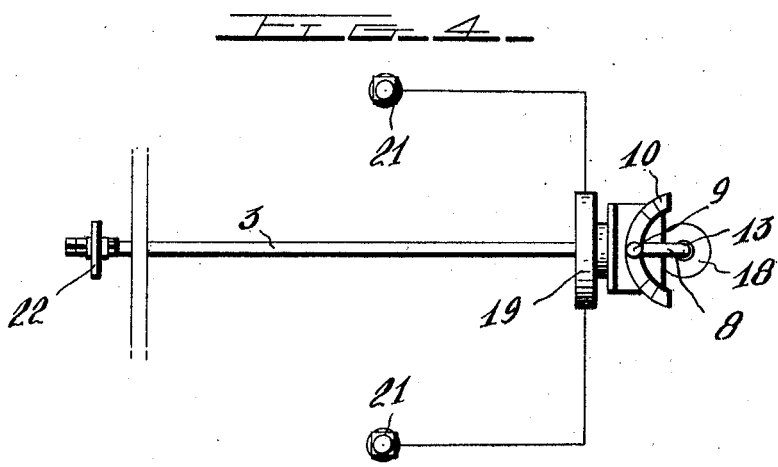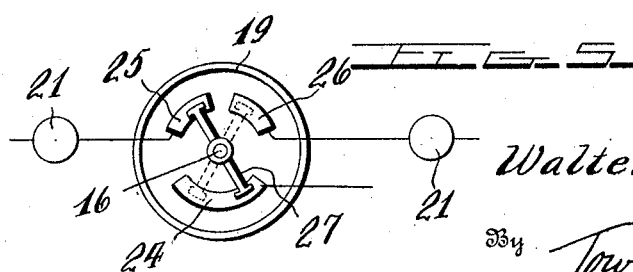

UNITED STATES PATENT OFFICE.

WALTER McWILLIAMS, OF FLORENCE TOWNSHIP, BURLINGTON COUNTY, NEW JERSEY.

AUTOMOBILE SIGNAL.

1,408,461.  Specification of Letters Patent.  Patented Mar. 7, 1922.

Application filed June 15, 1921. Serial No. 477,664.

*To all whom it may concern:*

Be it known that I, WALTER McWILLIAMS, a citizen of the United States, residing at Florence Township, in the county of Burlington and State of New Jersey, have invented certain new and useful Improvements in an Automobile Signal, of which the following is a specification.

My invention relates to automobile signals, the particular object being the provision of a manually operable signal visible from the rear of the vehicle to indicate the direction in which the automobile is to turn, and having associated therewith electrically operated signal means disposed at the sides of the vehicle.

With this and other objects in view, as will be apparent from the description, my invention resides in the novel construction, combination and arrangements of parts hereinafter described and claimed, and illustrated in the accompanying drawings, in which—

Figure 1, is a plan view, partly in section, of an automobile equipped with the signal;

Figure 2, a rear elevation of an automobile showing a semaphore employed;

Figure 3, a vertical section through the vehicle illustrating the application and operation of a semaphore;

Figure 4, a plan view illustrating the semaphore and the lights associated therewith; and Figure 5, a detailed illustration of the switch employed.

In detail, the invention comprises a semaphore arm 1, located at the rear of the automobile body, generally indicated as at 2, and disposed centrally thereof on the end of a longitudinally disposed shaft 3 rotatably carried in brackets 4 on the bottom of the automobile body along the longitudinal center thereof. The front end of shaft 3 carries a pinion 5 in mesh with the pinion 6 disposed on the lower end of a vertical shaft 7 extending upwardly along the driver's seat and actuated by a handle 8 having a toothed head 9 adapted to engage with an indicating quadrant 10 carried by a bracket 11 secured to the seat and having a longitudinally extending arm 12 provided with a bearing 13 for the upper end of shaft 7. The lower portion of the shaft 7 is journaled in a bearing 14 disposed on the floor of the vehicle.

A downwardly extending vertically disposed arm 15 is formed integral with the bracket 11 and is provided at its lower end with a bearing to receive a longitudinally disposed shaft 16 carrying a pinion 17 in mesh with the pinion 18 carried by the shaft 7. A rotatable switch 19 is disposed beneath the driver's seat on the inner end of shaft 16 and is adapted to be operated by rotation of shaft 16 through the medium of the pinions 17 and 18. Disposed at opposite sides of the vehicle, substantially centrally thereon, are brackets 20 carrying four-way lamps 21 arranged in circuit with the switch 19 and a suitable electrical source, not shown.

The semaphore arm 1 is provided with an enlarged head 22 preferably of a vivid coloring and is adapted to be illuminated at night by the usual tail light 23, which, in this instance, is disposed a little above the semaphore, as illustrated in Figure 2. A switch 19 may be of any approved type, but in this instance comprises a three-point contact switch, the contacts being designated as 24, 25 and 26, respectively, the contact 24 being in connection with the electrical supply source while contacts 25 and 26 are respectively connected to the lamps 21. The circuit is closed to either of said lamps by means of a bridge piece 27 carried by the inner end of shaft 16 and at all times in contact with the point 24. Upon rotation of the shaft 16 it is obvious that the member 27 will bridge contact 24 and one of the contacts 25 or 26, depending upon the direction in which the semaphore is displayed. Contacts 25 and 26 are spaced a sufficient distance to provide for a break in the circuit when the semaphore is in an upright position, as disclosed in Figure 5.

In operation, when it is desired to indicate the direction in which the vehicle is about to be turned, the driver moves the handle 8 from the quadrant 10 to the side in which the signal is to be displayed, whereupon, through the medium of the shafts and pinions, as described, the semaphore arm 1 will be moved over to the right or left as desired, and the switch 19 will be operated to close the circuit of either the right or left lamp 21, thereby displaying a visual signal at the rear of the vehicle and at the side thereof.

While I have described and illustrated, in this preferred embodiment of my invention, certain details of construction, I desire it to be understood that I do not intend to limit myself to these, but that any such may be employed as will fall within the scope of the invention as claimed.

I claim:

In a direction indicator, a revolving shaft adapted to be secured to the under part of a motor vehicle body, said shaft carrying at one end a semaphore arm rigidly secured thereto, and at its other end a beveled gear, a supporting bracket secured to a vehicle seat, a vertical shaft carried by said bracket, said shaft being provided at its upper end with an operating handle and at its lower end with a beveled gear meshing with said first mentioned gear, the upper end of said vertical shaft carrying beveled gear means for actuating a lighting system, substantially as described.

In testimony whereof I affix my signature.

WALTER McWILLIAMS.